(12) United States Patent
Richardson et al.

(10) Patent No.: US 7,849,511 B2
(45) Date of Patent: Dec. 7, 2010

(54) DETERMINING AUTHORIZED USE OF A SOFTWARE APPLICATION

(76) Inventors: Eric Clark Richardson, c/o Microsoft Corporation, One Microsoft Way, Redmond, WA (US) 98052; Yaron Hezroni, c/o Microsoft Corporation, One Microsoft Way, Redmond, WA (US) 98052; Manoranjan Mishra, c/o Microsoft Corporation, One Microsoft Way, Redmond, WA (US) 98052; Prashant Shyamsundar Mishra, c/o Microsoft Corporation, One Microsoft Way, Redmond, WA (US) 98052; Surender Mohan, c/o Microsoft Corporation, One Microsoft Way, Redmond, WA (US) 98052; Jacob Thomas, c/o Microsoft Corporation, One Microsoft Way, Redmond, WA (US) 98052

( * ) Notice: Subject to any disclaimer, the term of this patent is extended or adjusted under 35 U.S.C. 154(b) by 965 days.

(21) Appl. No.: 11/708,117

(22) Filed: Feb. 16, 2007

(65) Prior Publication Data

US 2008/0201493 A1 Aug. 21, 2008

(51) Int. Cl.
*H04L 9/32* (2006.01)
(52) U.S. Cl. .......................... 726/26; 726/27
(58) Field of Classification Search ............. 726/26–31; 713/168–170, 176; 705/56–59
See application file for complete search history.

(56) References Cited

U.S. PATENT DOCUMENTS 4,685,055 A * 8/1987 Thomas ........................ 705/56

(Continued)

FOREIGN PATENT DOCUMENTS

WO WO2004044670 A2 5/2004

(Continued)

OTHER PUBLICATIONS

Matheus, "Authorization for Digital Rights Management in the Geospatial Domain," Date: Nov. 7, 2005, p. 55-64, http://delivery.acm.org/10.1145/1110000/1102557/p55-matheus.pdf?key1=1102557&key2=9613328511&coll=Portal&dl=GUIDE&CFID=74220359&CFTOKEN=92790055.

(Continued)

*Primary Examiner*—Hosuk Song
(74) *Attorney, Agent, or Firm*—Capitol City TechLaw; Richard C. Irving

(57) ABSTRACT

A user may enable features of a software application installed on a processing device only when the processing device is at a location for which the processing device is authorized to use the software application. If the processing device is offline, the processing device may refer to data in a component of the processing device to determine whether the data includes an authorized value. If processing device determines that the data has the authorized value, then the features of the installed software application may be enabled. In some embodiments, data with respect to unauthorized use of the software application may be recorded. In other embodiments, a determination may be made regarding whether a processing device, associated with an entity, violates a license agreement of the entity with respect to an installed software application. If the license agreement of the entity is determined to be violated, then information may be recorded.

17 Claims, 8 Drawing Sheets

U.S. PATENT DOCUMENTS

| | | |
|---|---|---|
| 6,138,009 A | 10/2000 | Birgerson |
| 6,574,732 B1 | 6/2003 | Steinberg et al. |
| 2004/0210386 A1 | 10/2004 | Wood et al. |
| 2005/0154904 A1 | 7/2005 | Perepa et al. |
| 2005/0216194 A1 | 9/2005 | Chang |
| 2006/0031830 A1 | 2/2006 | Chu et al. |
| 2006/0112194 A1 | 5/2006 | Minogue et al. |

FOREIGN PATENT DOCUMENTS

| | | | |
|---|---|---|---|
| WO | WO2005104426 | A2 | 11/2005 |

OTHER PUBLICATIONS

Matheus, "Declaration and Enforcement of Access Restrictions for Distributed Geospatial Information Objects," http://tumb1.biblio.tu-muenchen.de/publ/diss/in/2005/matheus.pdf.

* cited by examiner ness of the software application installed, the
user may activate or enable features of the software application, either online through a network, or offline. Without activating or enabling the features of the software application, most, if not all, of the features of the software application may be non-functional or may have limited functionality.

DETERMINING AUTHORIZED USE OF A SOFTWARE APPLICATION

BACKGROUND

Sometime after purchasing a processing device, such as, for example, a personal computer (PC) or other processing device, a user may install a software application on the processing device. Once the software application is installed, the user may activate or enable features of the software application, either online through a network, or offline. Without activating or enabling the features of the software application, most, if not all, of the features of the software application may be non-functional or may have limited functionality.

A user may obtain a copy of a software application having a license restricting authorized use of the software application to a particular geographic area, such as, for example, a particular country, region, or other geographic area. However, some users may install the software application and may activate and use the features of the software application on a processing device located in a geographic area in which use of the software application is unauthorized, according to a license. Such usage of the software application may have a negative effect on a software developer's revenue from sales of a different or other version of the software application intended for use on a processing device located in the geographic area.

Further, entities, such as, for example, companies, associations, organizations, or other groups may obtain a software application subject to a volume license agreement which authorizes use of the software application on up to a certain number of processing devices. In addition, the volume license agreement may restrict usage of the software application to a particular geographic region, such as, for example, a particular country, region, or other geographic area. A developer of the software application may lose revenue when an entity uses the software application in a manner which violates terms of the volume license agreement.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Software applications may be licensed for use only in particular geographic areas. A user of a processing device may obtain a copy of a software application which the user may install on the processing device. In one embodiment, consistent with the subject matter of this disclosure, a user may attempt to activate or enable features of an installed software application. If the processing device is connected to a network, the processing device may send a message through a network to provide a product identifier, identifying the software application installed on the processing device, to a second processing device. The second processing device may determine a location of the processing device based on a network address included in a header of the message sent through the network. The second processing device may then determine whether the location of processing device is a location at which the processing device is authorized to use the software application. If the second processing device determines that the processing device is at a location at which the processing device may use the software application, then the second processing device may send a response to the first processing device enabling or activating one or more features of the software application.

If the processing device is determined to be offline, then the processing device may refer to data included in a component of the processing device. The processing device may then enable one or more features of the software application if the data included in the component of the processing device includes an authorized value. The authorized value may represent one or more components of a hardware configuration or an origin of the processing device.

In another embodiment, a processing device may provide a product identifier to a second processing device via a network. The second processing device may determine whether the processing device is associated with an entity. Second processing device may then determine whether a software application installed on the processing device violates a license agreement of the entity for use of the software application. In some implementations, the second processing device may count a number of processing devices, associated with the entity, which uses the software application and may record a violation of the license agreement when the number processing devices exceed a predetermined limit. In other implementations, the second processing device may determine a geographic location of the processing device associated with the entity and may record a violation of the license agreement when the processing device is at a location for which use of the software application is not authorized.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
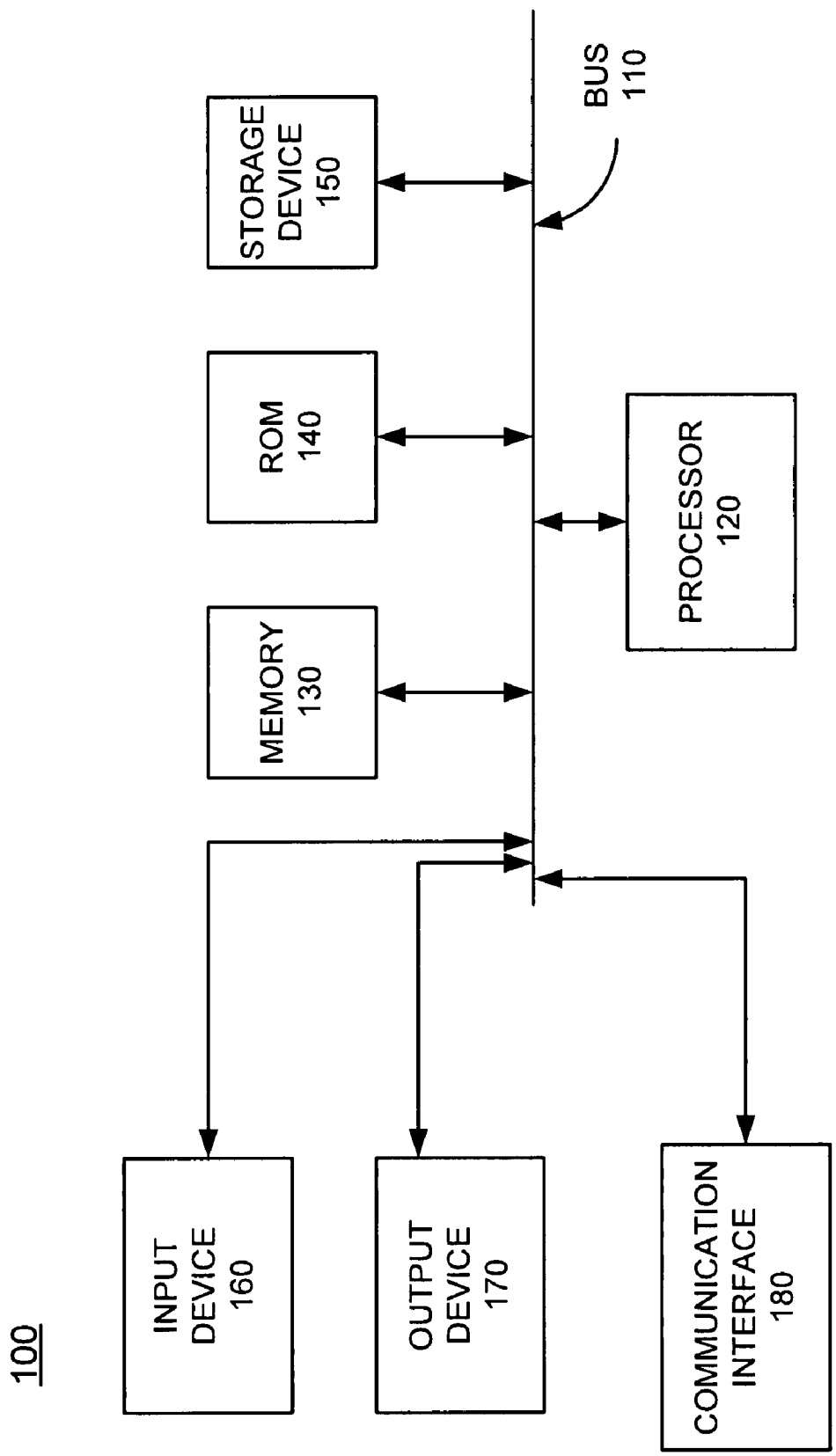
FIG. 1 is a functional block diagram of an exemplary processing device which may be used to implement embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

A user of a processing device such as, for example, a personal computer (PC) or other processing device, may purchase or obtain a copy of a software application, which the user may install on the processing device. The user may then attempt to activate or enable features of the software application. If the features of the software application are not activated or enabled, the software application may have limited or no functionality.

When the user attempts to activate the features of the software application while the processing device has a connection to a network, the processing device may prompt the user for a product identifier, which may identify the software application and a version of the software application. After obtaining the product identifier from the user, the processing device may send a message, including the product identifier or an indicator thereof, through the network to a second processing device, which in some embodiments may be a server. The second processing device may obtain a network address from a header of the message and, based on at least a portion of the network address, may determine a geographic location of the processing device. The second processing device may then determine whether a license associated with the software application authorizes use of the software application at the geographic location. If the second processing device determines that the license authorizes use of the software application at the geographic location, the second processing device may send a response to the processing device, which may enable or activate the features of the software application installed on the processing device.

In another embodiment consistent with the subject matter of this disclosure, a processing device may prompt a user to enter a product identifier which may identify a software application and a version thereof. After the user enters the product identifier, the processing device may include the product identifier, or an indication thereof, in a message that the processing device may send to a second processing device, such as, for example, a server or other processing device. The second processing device may receive the message and may determine whether the processing device is associated with an entity, such as, for example, a company, an association, an organization, or other group. If the second processing device determines that the processing device is associated with an entity, then the second processing device may determine whether the processing device uses a software application in a way which violates a volume license agreement. In some embodiments, the second processing device may count a number of different processing devices, associated with the entity, and may record information with respect to the entity violating the volume license agreement. In other embodiments, the second processing device may determine a location of the processing device, based on at least a portion of a network address in a header of the message sent from the processing device to the second processing device. If the processing device is determined to be in a location for which use of the software application is not authorized, a violation of the volume license agreement may be recorded.

Exemplary Processing Device

FIG. 1 is a functional block diagram of a processing device 100 which may be used in embodiments consistent with the subject matter of this disclosure. Processing device 100 may include a bus 110, a processor 120, a memory 130, a read only memory (ROM) 140, a storage device 150, an input device 160, an output device 170, and a communication interface 180. Bus 110 may be a communication interface that permits communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of tangible media for storing data and/or instructions.

Input device 160 may include one or more conventional mechanisms that permit a user to input information to processing device 100, such as, for example, a keyboard, a mouse, or other input device. Output device 170 may include one or more conventional mechanisms that output information to the user, including a display, a printer, or other output device. Communication interface 180 may include any transceiver-like mechanism that enables processing device 100 to communicate with other devices or networks.

Processing device 100 may perform such functions in response to processor 120 executing sequences of instructions contained in a machine-readable medium, such as, for example, memory 130, or other tangible medium. Such instructions may be read into memory 130 from another tangible machine-readable medium, such as storage device 150, or from a separate device via communication interface 180.

Exemplary Operating Environment

Figure 2:
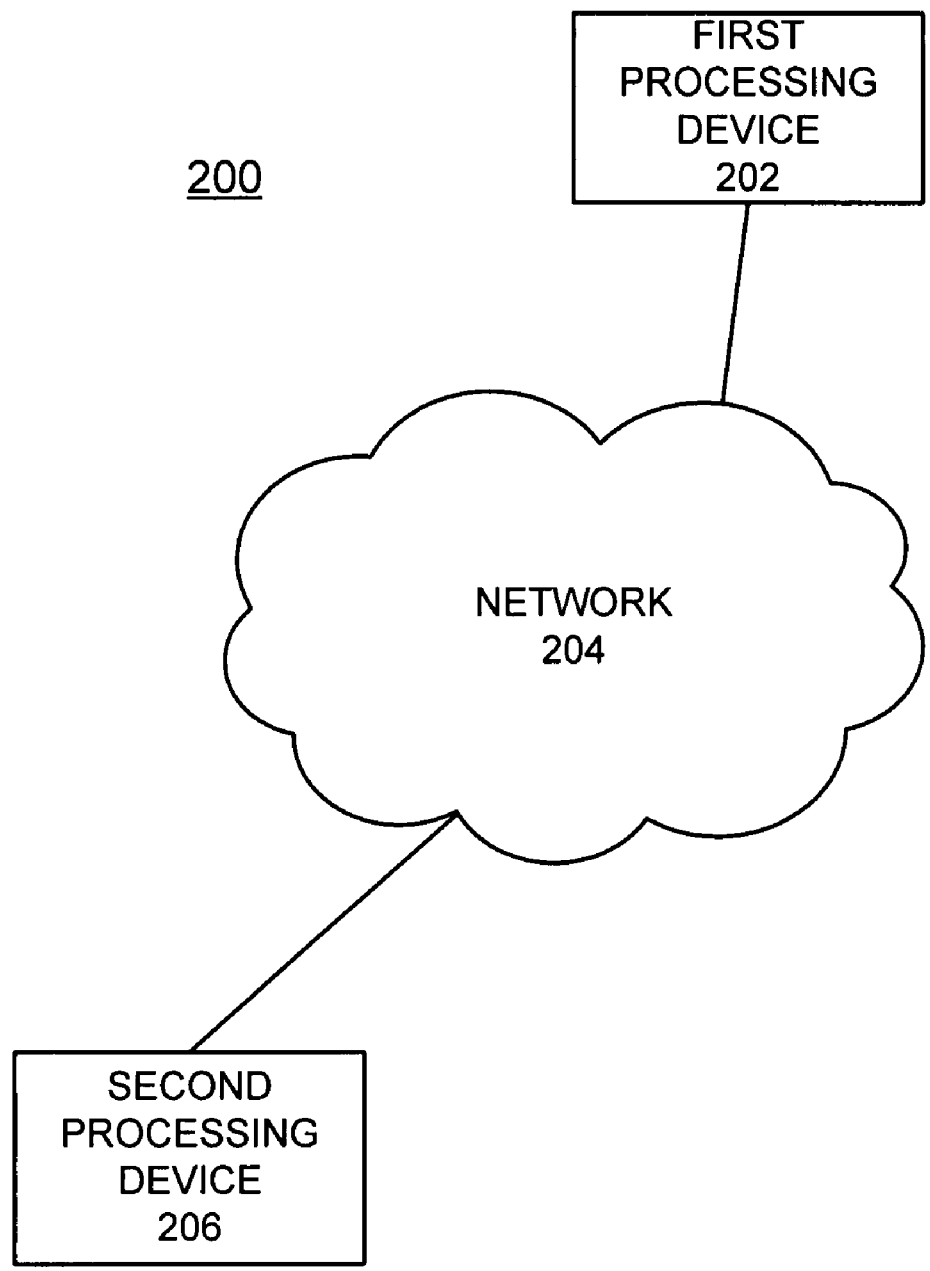
FIG. 2 illustrates an exemplary operating environment for embodiments consistent with the subject matter of this disclosure.

FIG. 2 illustrates an exemplary operating environment 200 for an embodiment consistent with the subject matter of this disclosure. Exemplary operating environment 200 may include a first processing device 202, a second processing device 206, and a network 204. First processing device 202 and second processing device 206 may be implemented by a processing device such as, for example, processing device 100 (FIG. 1). In one embodiment, first processing device 202 may be a PC or other processing device and second processing device 206 may be a server or other processing device. Network 204 may be a single network, a group of networks, which may include the Internet, a Public Switched Telephone Network (PSTN), or a combination of any of the above. In one embodiment, one or both of first processing device 202 and second processing device 206 may be connected to a network 204 via a wireless interface.

Exemplary Processing

Figure 3A:
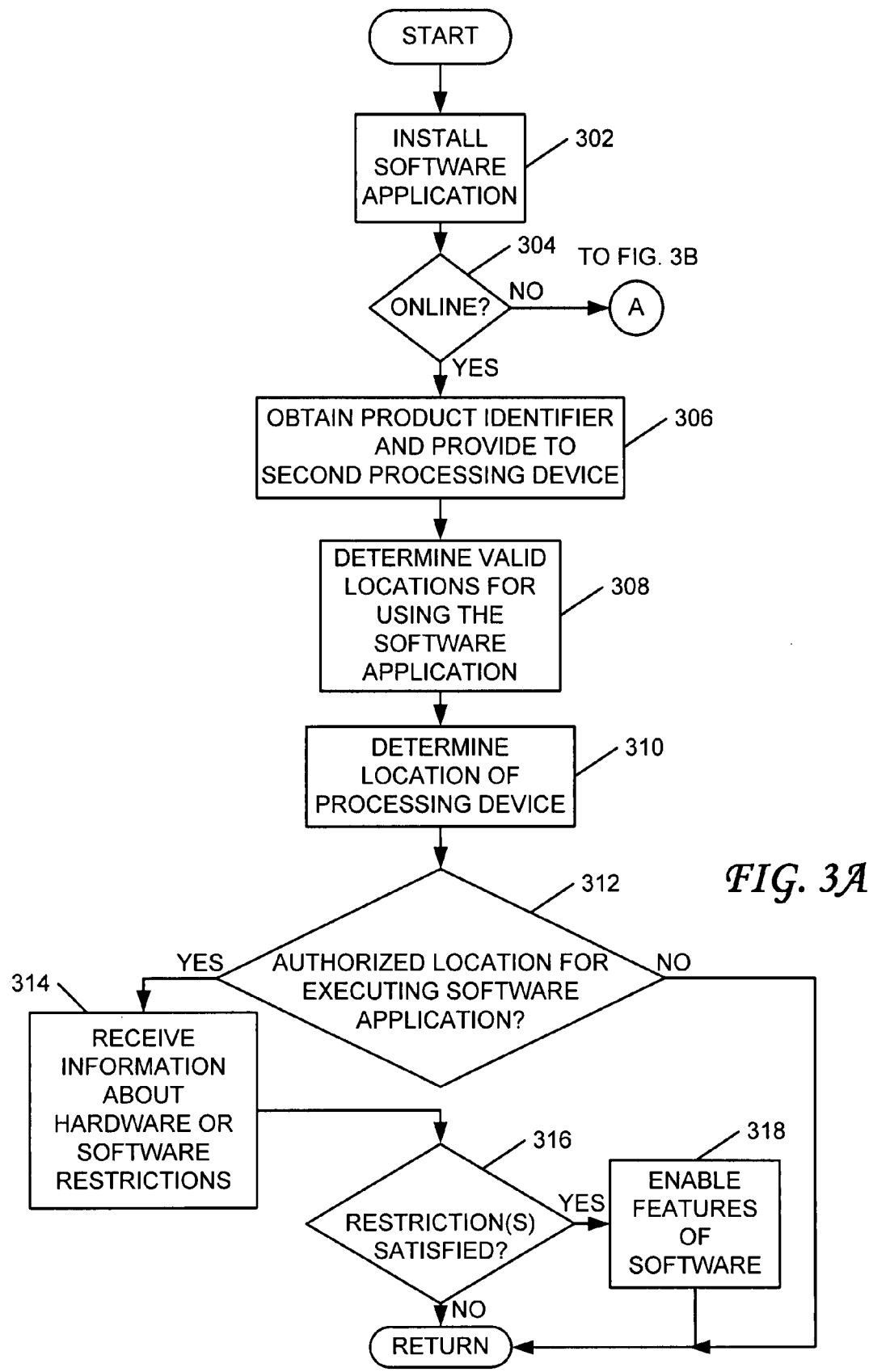
FIGS. 3A-3B are flowcharts which illustrate exemplary processing in an embodiment of the subject matter of this disclosure.
Figure 3B:
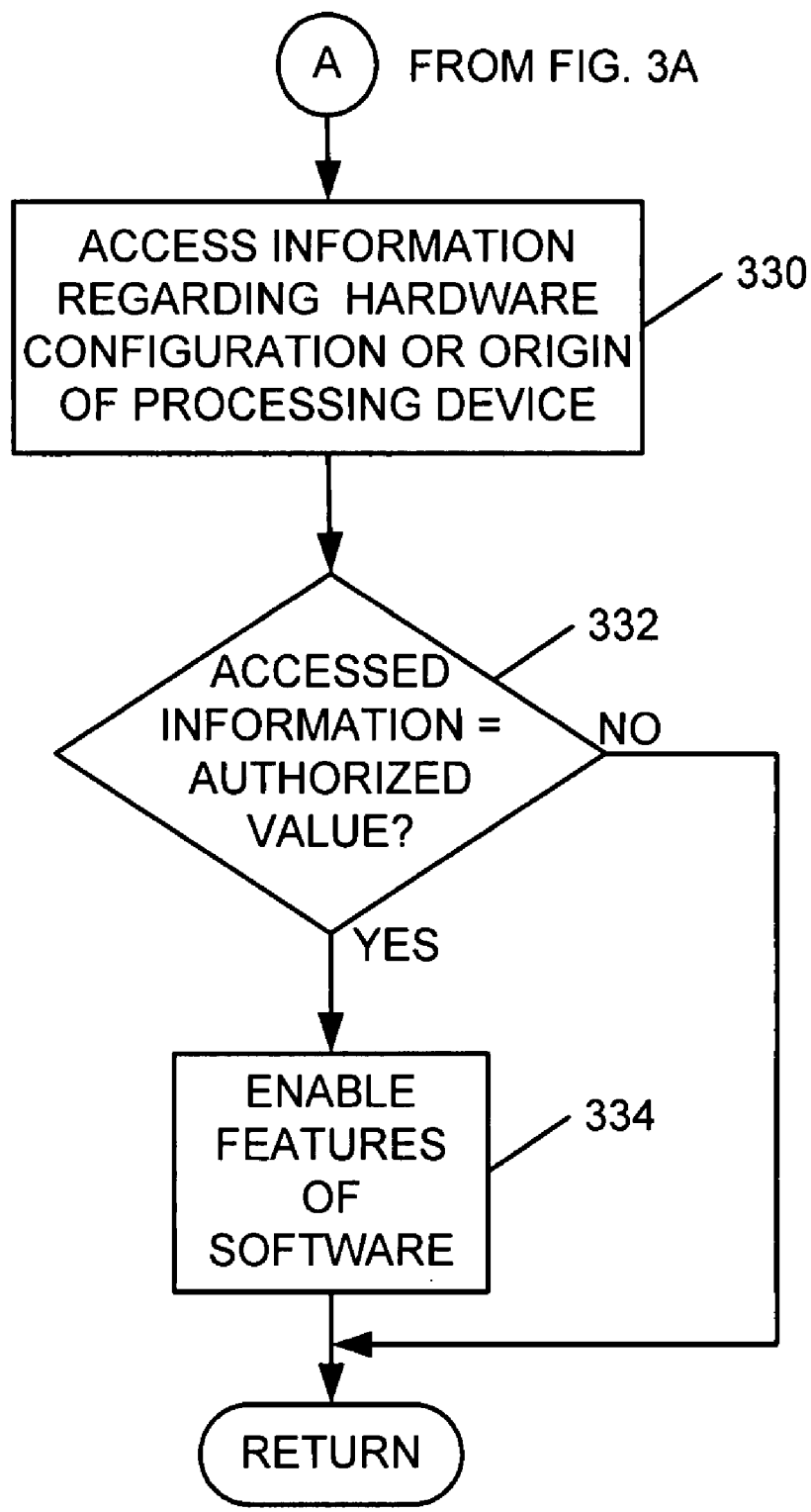

FIGS. 3A-3B are flowcharts that illustrate an exemplary process that may be implemented in an embodiment consistent with the subject matter of this disclosure. The illustrated exemplary process may be performed to activate or enable features of the software device, which may be online or offline.

The process may begin with a user installing a software application on first processing device 202, which may be, for example, a PC or other processing device (act 302). First processing device 202 may then determine whether the processing device is connected to a network (online) (act 304). If the first processing device 202 determines that it is connected to a network, then first processing device 202 may prompt the user for a product identifier, which may be indicative of a license associated with the software application, and first processing device 202 may provide the product identifier or other indicator, associated with the license agreement for the software application, to second processing 206 device via a message sent through network 204 (act 306).

Next, second processing device 206 may refer to a database having license information and may determine one or more authorized locations from which first processing device 202 may execute the software application according to an associated license agreement (act 308). Second processing device 206 may then determine a location of first processing device 202 (act 310). The determined location may include a region, a country, a county, a city, or other geographical subdivision. Second processing device 206 may determine the location by examining at least a portion of a network address included in a header of the message received from first processing device 202. In some embodiments, the network address may be an Internet Protocol (IP) address of first processing device 202, may be an IP address of a network gateway or network access point which provides access to a network, or may be an IP address associated with an Internet Service Provider (ISP). The location may be determined by searching a database of IP addresses such as, for example, a database provided by Akamai of Cambridge, Mass., or another source and at least partially matching the network address included in the header of the message from first processing device 202.

Next, second processing device 206 may then compare the determined location of first processing device 202 with the determined one or more authorized locations (act 312). If second processing device 206 determines that first processing device 202 is in a location for which execution of the software application is unauthorized, based on the associated license, then the process may end without activating or enabling the features of the software application. In some implementations, when second processing device 206 determines that first processing device 202 is not at a location for which execution of the software application is authorized, then second processing device 206 may send a command or message to first processing device 202 to enable one or more features of the software application for a limited time period.

If, at act 312, second processing device 206 determines that first processing device 202 is at a location for which execution of the software application is authorized, based on the associated license, then first processing device 202 may receive information from second processing device 206, which may include any hardware or software restrictions for executing a software application (act 314). As an example, a hardware restriction may include a particular type of processor to be included in first processing device 202, or other hardware restriction, and a software restriction may include a particular version of an operating system executing on first processing device 202 or other software restriction. First processing device 202 may then determine whether the hardware or software restrictions are satisfied by first processing device 202 (act 316). In one embodiment, first processing device 202 may determine whether the hardware or software restrictions are satisfied by referring to a location in a memory, such as, for example, RAM, ROM, or other storage medium. In other embodiments, first processing device 202 may refer to a location in a software or firmware component of first processing device 202, such as, for example, a location included in an operating system component or a location included in a Basic Input/Output System (BIOS). The BIOS may be software built into first processing device 202, which may determine capabilities of first processing device 202. The BIOS may include code for controlling, for example, a display screen, serial communications, a keyboard, disk drives and other miscellaneous functions. If first processing device 202 determines that the hardware or the software restrictions are satisfied, then first processing device 202 may send a message to second processing device 206 indicating satisfaction of the hardware or software restrictions, to which second processing device 206 may send a command to first processing device 202 to enable or activate the features of the software (act 318). In some embodiments, when first processing device 202 determines that the hardware or software restrictions are satisfied, first processing device may enable or activate the features of the software without sending a message to second processing device 206 and receiving a command to activate or enable the features of the software.

When first processing device 202 determines that first processing device 202 is not connected to a network (not online) (act 304) then first processing device 202 may access information, located in a component of first processing device 202, indicating a hardware configuration of first processing device 202 and/or an origin (OEM) of first processing device 202 (act 330; FIG. 3B). In one embodiment, the hardware configuration may be determined by accessing a location included in the BIOS. Further, information indicative of the origin of first processing device 202 may be included in another location of the BIOS, in a memory location, in a file on a storage device, or in another component a first processing device 202. First processing device 202 may then access data indicative of one or more authorized hardware configurations and/or authorized origins (OEMs) in a same or different component of first processing device 202 and may determine whether the hardware configuration and/or the origin (OEM) of first processing device 202 have values which are authorized, thereby indicating that the features of the software application may be enabled or activated (act 332). If first processing device 202 determines that the hardware configuration of first processing device 202 and/or the origin of first processing device 202 are authorized values, then first processing device 202 may enable or activate the features of the software (act 334).

Figure 4:
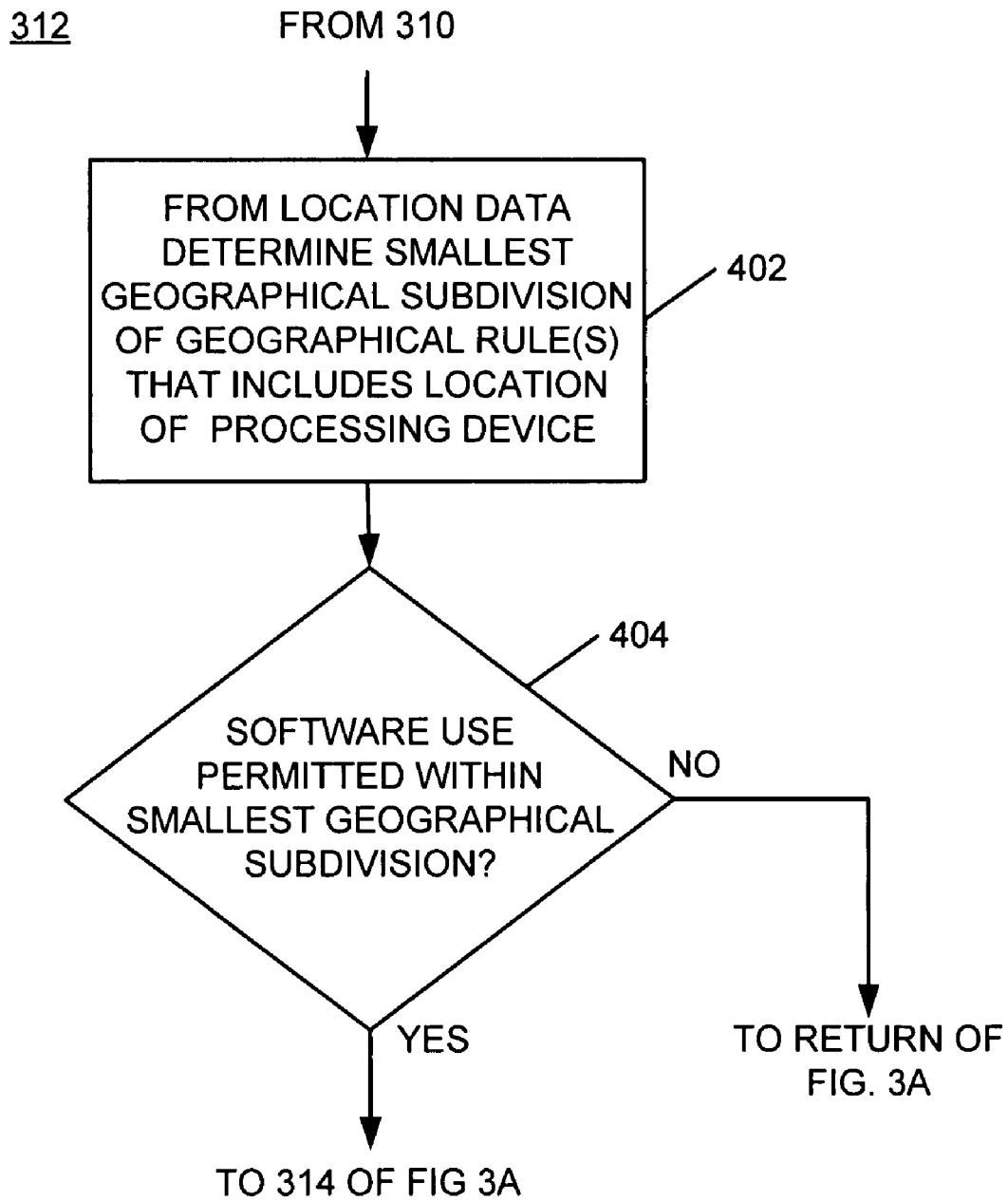
FIG. 4 is a flowchart which illustrates, in more detail, processing with respect to a portion of the flowchart of FIG. 3A.

FIG. 4 is a flowchart that illustrates exemplary processing which may occur in an embodiment of second processing device 206 when executing act 312 (FIG. 3A). Second processing device 206 may refer to rules regarding geographical subdivisions to determine a smallest geographical subdivision that includes a location of first processing device 202 (act 402). This may be accomplished by mapping a location of first processing device 202 to a smallest geographical subdivision included in the rules.

Second processing device 206 may then determine whether the software application of first processing device 202 is permitted to execute based on the smallest geographic subdivision of the rules in which first processing device 202 is located (act 404). If the software application of first processing device 202 is permitted to execute, then processing may proceed at act 314 (FIG. 3A). Otherwise, the process may end without enabling or activating the features of the software on first processing device 202. As an example, the rules may indicate that the software may be authorized for execution in a country, for example, India, but may not be authorized for execution in a city, for example, Bombay. In this example, if first processing device 202 is determined to be located in Bombay, then the software may not be enabled or activated on first processing device 202. However, if first processing device 202 is determined to be in any other city, town, or village within the country, India, then the features of the software may be enabled or activated on first processing device 202.

Figure 5:
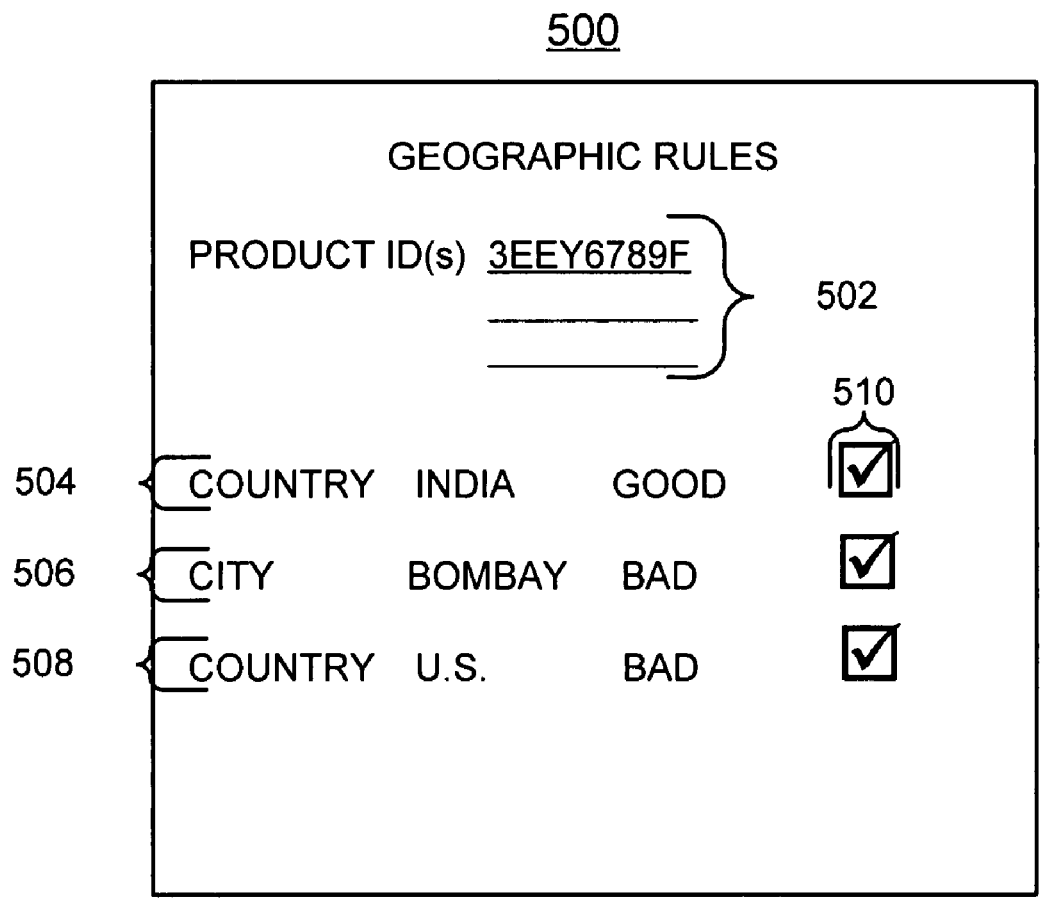
FIG. 5 illustrates an exemplary display screen which may be used to define geographic rules and to selectively enable and disable individual ones of the geographic rules in embodiments consistent with the subject matter of this disclosure.

FIG. 5 illustrates an exemplary display screen 500, which may be displayed when a user of second processing device 206 defines geographical rules that may apply to execution of a software application, in accordance with a license agreement. For example, the user may define one or more product IDs 502 identifying one or more software applications having identical geographic restrictions with respect to execution of the respective software applications. Further, the user may define one or more geographic restrictions with respect to a number of different types of geographic subdivisions. The geographic subdivisions may include a country, a region, a city, a section of a city, or other geographic subdivisions. With respect to the example of exemplary display screen 500, rule 504 indicates that execution of a software application identified by product ID, 3EEY6789F, is permitted (Good) in a country, India, rule 506 indicates that execution of the software application identified by the product ID, 3EEY6789F, is not permitted (Bad) in a city, Bombay, and a rule 508 indicates that execution of the software application identified by the product ID, 3EEY6789F, is not permitted (Bad) in a country, United States. Each of rules 504, 506, and 508 may be selectively enabled or disabled. In exemplary display 500, a rule is shown as being enabled, by a box having a checkmark, such as shown by checkmark boxes 510. The user may selectively enable or disable a rule by selecting one of the checkmark boxes associated with the rule via a pointing device, such as a computer mouse or other device, a stylus, a user's finger on a touch screen, input via a keyboard, or via another selection method. Selection of a particular checkmark box may cause the box to toggle from a check indication, as shown by exemplary display 500, to an unchecked indication, indicating that the rule is disabled. The unchecked indication may be shown as a box not having a checkmark.

Display 500 is an exemplary display. In other embodiments, other means may be employed to define geographical rules and to selectively enable and disable individual rules. For example, enabled rules may be indicated by a particular colored lettering, such as, for example, green lettering, and disabled rules may be indicated by another colored lettering, such as, for example, red lettering. Further, numerous other methods may be employed to define rules, to selectively enable and disable rules, and to indicate whether individual rules are enabled or disabled.

Figure 6:
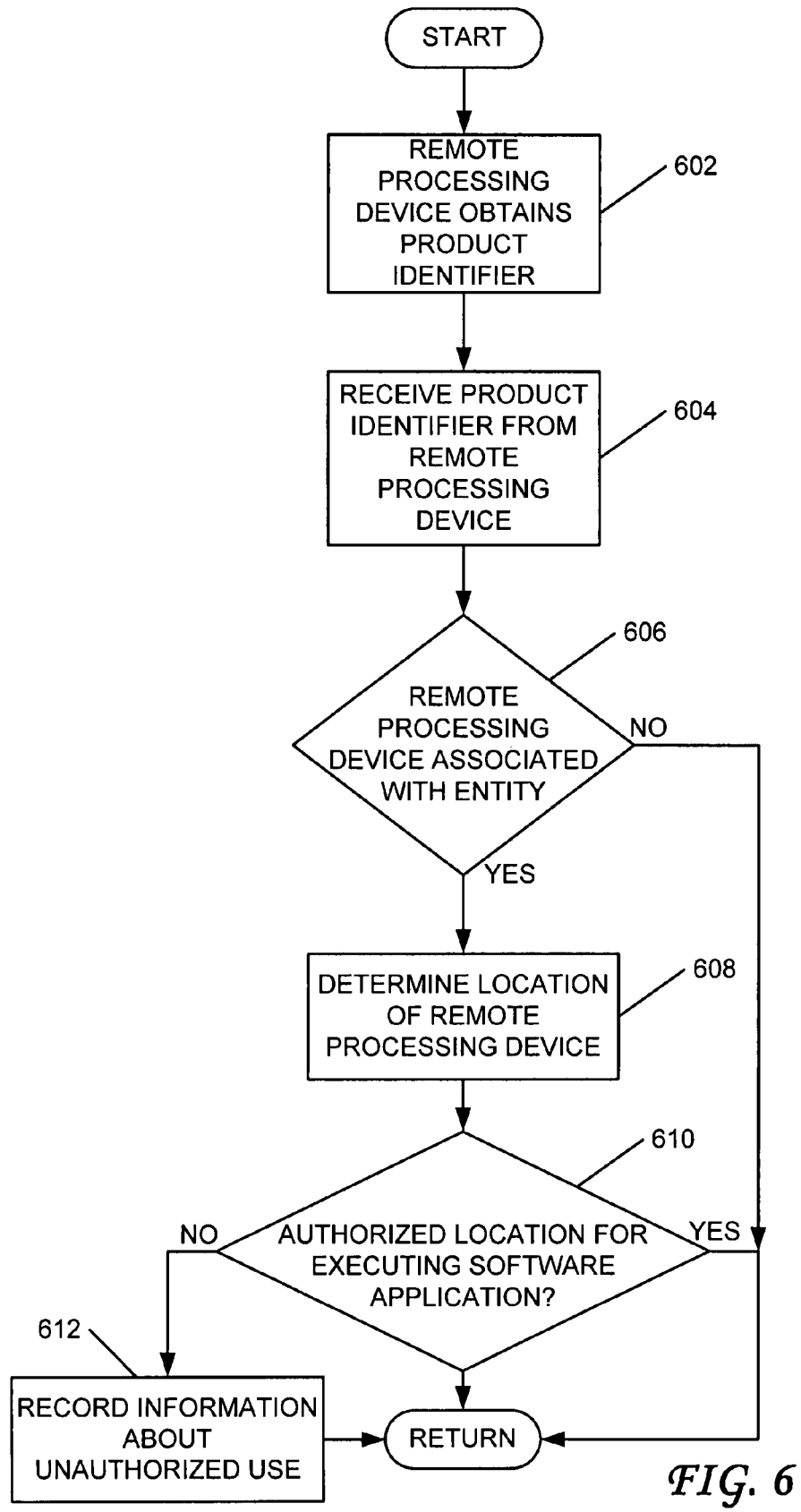
FIGS. 6 and 7 are flowcharts which illustrate exemplary processing which may be performed in embodiments consistent with the subject matter of this disclosure

FIG. 6 is a flowchart which illustrates an exemplary process for determining whether a product, such as, for example, a software application, is being used in accordance with a license agreement, such as, for example, a volume license agreement with an entity. The entity may be a company, an organization, an association, or other group.

The process may begin with first processing device 202 obtaining a product identifier corresponding to a software application available for execution on first processing device 202 (act 602). In one embodiment, the product identifier may be obtained by referring to data in a storage medium. In another embodiment, first processing device 202 may prompt a user for and may receive the product identifier.

Next, second processing device 206 may receive the product identifier in a message sent from first processing device 202 (act 604). Second processing device 202 may then determine whether first processing device 202 is associated with an entity (act 606). In one embodiment, second processing device 206 may determine whether first processing device 202 is associated with an entity by examining an identifier, which may be included in the message sent from first processing device 202 to second processing device 206. The identifier may indicate a particular entity. In another embodiment, second processing device 206 may determine whether first processing device 202 is associated with an entity by examining at least a portion of a network address from a header of the message sent from first processing device 202. In some embodiments, the network address may be an IP address. Second processing device 206 may determine whether first processing device 202 is associated with an entity by performing subnet masking on at least the examined portion of the network address. For example, if the examined portion of the network address falls within a certain address range, then first processing device 202 may be determined to be associated with an entity. The network address may be from a range of addresses assigned to the entity or may be an address of an Internet Service Provider (ISP), or a network address from a network access device such as, for example, a network gateway, or other device.

Next, second processing device 206 may determine a location of first processing device 202 (act 608). Second processing device 206 may determine the location of first processing device 202 in a same manner as previously described with reference to act 310 (FIG. 3A). Second processing device 206 may then determine whether the determined location of first processing device 202 is an authorized location for first processing device 202 to execute software application (act 610). Second processing device 206 may make this determination in a same manner as previously described with reference to act 312 (FIG. 3A).

If a second processing device 206 determines that the location of first processing device 202 is not a location from which first processing device 202 is authorized to execute software application, then second processing device 206 may record information with respect to unauthorized use of the software application by first processing device 202 (act 612).

Figure 7:
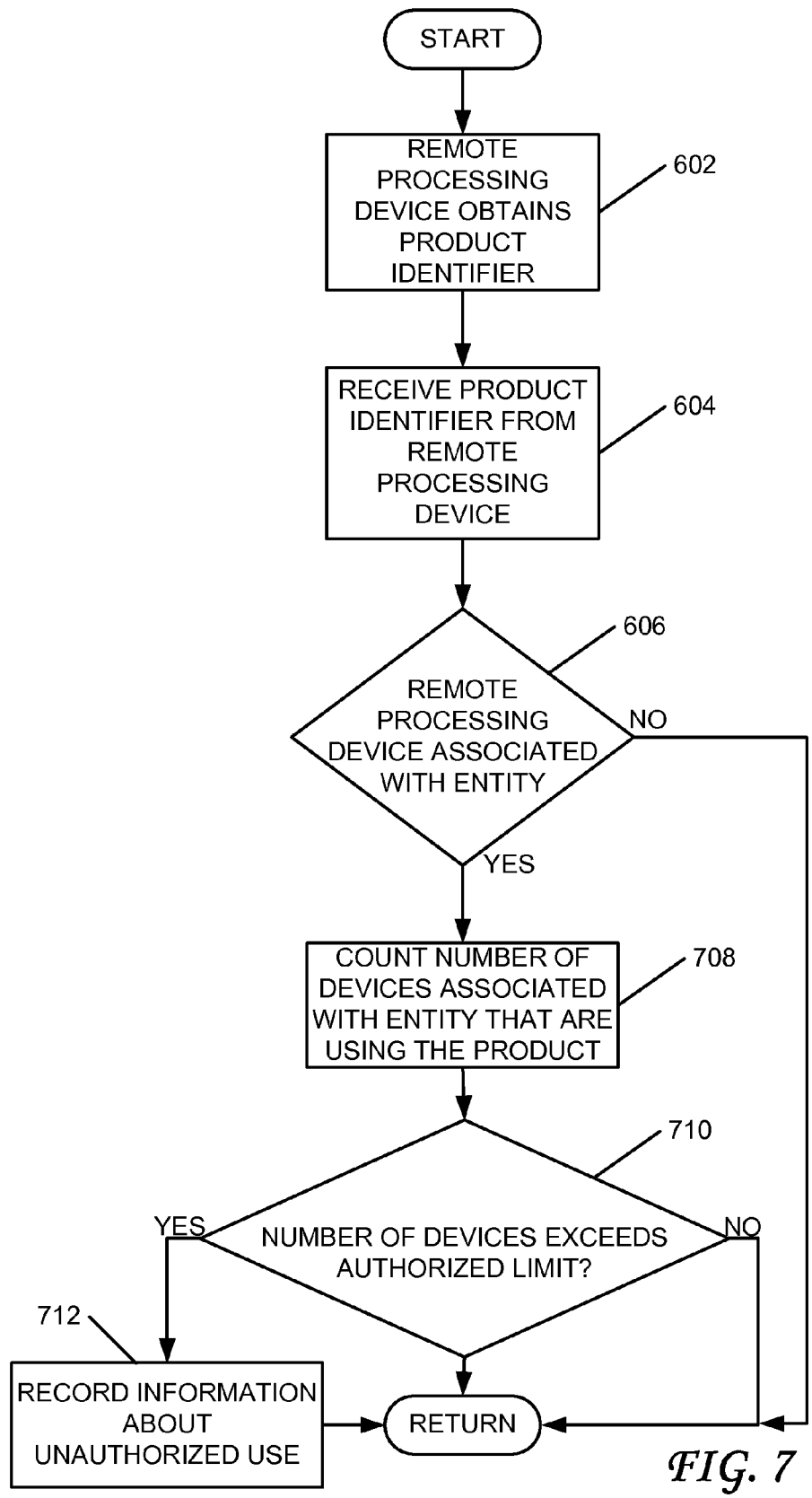

FIG. 7 illustrates a variation of the exemplary process shown by the flowchart of FIG. 6. In the exemplary flowchart of FIG. 7, act 602-606 are identical with respect to FIG. 6. However, with respect to FIG. 7, after second processing device 206 determines that first processing device 202 is associated with an entity, second processing device 206 may increment a counter to count a number of processing devices associated with the entity that use the product or software application identified by the product identifier (act 708). In one embodiment, second processing device 206 may identify individual processing devices by, for example, a relatively unique processing device ID which may be included in the message sent from first processing device 200 to second processing device 206 during act 604. Second processing device 206 may then access, for example, a database which may include a number of processing devices on which the entity is authorized to have the product or software application installed. Second processing device 206 may then determine whether the counted number of devices, with respect to the entity, exceed the authorized number of processing devices (act 710). If so, second processing device 206 may record information about the unauthorized use of the product or software application by the entity.

If, during act 606, second processing device 206 determines that first processing device 202 is not associated with an entity, then the process may be completed.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. As one example, in some implementations, instead of recording information about unauthorized use of a software application by an entity, second processing device 206 may send a command to first processing device 202 to cause first processing device 202 to disable some or all of the features of the software application. In other implementations, other actions may be performed when second processing device 206 determines that an entity is using the software application in an unauthorized manner. Accordingly, the appended claims and their legal equivalents should only define the invention, rather than any specific examples given.

The invention claimed is:

1. A method for enabling features of a software application on a first processing device, the method comprising:
  determining whether the first processing device is online or offline,
  when the first processing device is determined to be online, performing:
    receiving from the first processing device, at a second processing device, a message including a product identifier identifying the software application installed on the first processing device,
    determining a location of the first processing device;
    applying a set of geographical rules to the determined location of the first processing device, the location of the first processing device being determined to be a location for which use of the software application is authorized when a geographical rule for a smallest geographical subdivision that includes the location of the processing device indicates that use of the software application is authorized, and
    sending a response from the second processing device to the first processing device to enable a plurality of features of the installed software application when the location of the processing device is determined to be the location for which use of the software application is authorized.

2. The method of claim 1, wherein when the first processing device is determined to be offline, the method further comprises:
  accessing information stored within a component of the first processing device, the information including at least one of hardware configuration information or information related to an origin of the first processing device,
  comparing the accessed information with data indicating an authorized value with respect to the accessed information, and
  enabling a plurality of features of the software application when the comparing determines that the accessed information includes the authorized value.

3. The method of claim 1, wherein when the first processing device is determined to be offline, the method further comprises:
  accessing information with respect to a type of processor included in the first processing device,
  comparing the accessed information with data indicating an authorized type of processor, and
  enabling a plurality of features of the software application when the comparing determines that the type of processor included in the first processing device includes the authorized type of processor.

4. The method of claim 1, wherein the determining of the location of the first processing device further comprises:
  obtaining at least a portion of a network address related to the first processing device; and
  determining the location of the first processing device based on the at least a portion of the network address.

5. The method of claim 1, further comprising:
  providing a response to the first processing device, when the first processing device is determined to be online, to enable the plurality of features of the installed software application for a limited time period when the location of the first processing device is determined to be in a location other than the location for which use of the software application is authorized.

6. The method of claim 1, further comprising:
  providing information to the first processing device with respect to a hardware restriction or a software restriction to be enforced by the first processing device.

7. The method of claim 1, further comprising:
  selectively enabling or disabling a geographical rule for determining whether the location of the first processing device is a location for which use of the software application is authorized.

8. A processing device for validating a software application installed on a remote processing device, the processing device comprising:
  at least one processor;
  a memory including instructions for the at least one processor; and
  a communication interface connecting the at least one processor with the memory, the memory including:
  instructions for receiving a product identifier from the remote processing device via a network,
  instructions for determining a location of the remote processing device,
  instructions for accessing a set of rules with respect to a geographic restriction on use of the installed software application, the set of rules including geographic restrictions on use of the installed software application with respect to a plurality of geographic subdivisions, at least one geographic subdivision being a subset of another geographic subdivision,
  instructions for mapping the location of the remote processing device to the set of rules to determine whether use of the software application is permitted at the location of the remote processing device,
  instructions for determining whether the remote processing device is associated with an entity, and
  instructions for determining whether the software application installed on the remote processing device violates a license agreement of the entity for use of the software application.

9. The processing device of claim 8, wherein the instructions for determining whether the remote processing device is associated with an entity further comprise:
  instructions for performing subnet mapping of at least a portion of a network address associated with the remote processing device to determine whether the remote processing device is associated with the entity.

10. The processing device of claim 8, wherein the instructions for determining whether the software application installed on the remote processing device violates a license agreement of the entity for use of the software application further comprise:

instructions for determining a location of the remote processing device based on at least a portion of a network address related to a network access point, and instructions for determining whether the location of the remote processing device is a location at which use of the software application is authorized according to the license agreement of the entity.

11. The processing device of claim 8, wherein the instructions for determining whether the software application installed on the remote processing device violates a license agreement of the entity for use of the software application further comprise:

instructions for incrementing a counter for counting a number of different remote processing devices associated with the entity and having the software application installed thereon, and instructions for determining whether a value of the counter exceeds a number of processing devices of the entity permitted to have the installed software application according to the license agreement of the entity.

12. The processing device of claim 8, wherein the memory further comprises:

instructions for selectively enabling or disabling a rule for determining whether the software application installed on the remote processing device violates the license agreement of the entity.

13. A tangible machine-readable medium having instructions recorded thereon for at least one processor, the tangible machine-readable medium comprising:

instructions for receiving from a processing device a product identifier identifying a software application installed on the processing device;

instructions for determining a location of the processing device based on at least a portion of a network address of a network gateway used by the processing device to access a network;

instructions for accessing a set of rules with respect to a geographic restriction on use of the installed software application, the set of rules including geographic restrictions on use of the installed software application with respect to a plurality of geographic subdivisions, at least one geographic subdivision being a subset of another geographic subdivision;

instructions for mapping the location of the processing device to the set of rules to determine whether use of the software application is permitted at the location of the processing device; and instructions for providing a response to the processing device to enable a plurality of features of the installed software application when the mapping of the location of the processing device to the set of rules determines that use of the software application is permitted at the location of the processing device.

14. The tangible machine-readable medium of claim 13, further comprising:

instructions for providing to the processing device information including a hardware restriction or a software restriction with respect to execution of the software application, the processing device being arranged to enforce the hardware restriction or the software restriction.

15. The tangible machine-readable medium of claim 13, further comprising:

instructions for providing a response to the processing device to enable a plurality of features of the installed software application for a limited time period when the mapping of the location of the processing device to the set of rules determines that use of the software application is restricted at the location of the processing device.

16. The tangible machine-readable medium of claim 13, wherein:

the instructions for mapping the location of the processing device to the set of rules determines that use of the software application is permitted at the location of the processing device when, according to the set of rules, use of the software application is permitted at a smallest geographic subdivision including the location of the processing device.

17. The tangible machine-readable medium of claim 13, wherein the geographic subdivisions include a country and at least one of a city or a town.

* * * * *